United States Patent [19]
Sato et al.

[11] Patent Number: 4,989,072
[45] Date of Patent: Jan. 29, 1991

[54] APPARATUS FOR TESTING AND ADJUSTING COLOR CATHODE RAY TUBE EQUIPMENT

[75] Inventors: Satoshi Sato, Kanagawa; Hiroshi Ichigaya, Saitama, both of Japan

[73] Assignee: Sony Corporation, Tokyo, Japan

[21] Appl. No.: 472,615

[22] Filed: Jan. 29, 1990

[30] Foreign Application Priority Data

| Jan. 31, 1989 | [JP] | Japan | 1-22293 |
| Jan. 31, 1989 | [JP] | Japan | 1-22294 |
| Feb. 8, 1989 | [JP] | Japan | 1-28974 |
| Feb. 13, 1989 | [JP] | Japan | 1-33383 |
| Feb. 17, 1989 | [JP] | Japan | 1-83039 |
| Apr. 14, 1989 | [JP] | Japan | 1-94426 |

[51] Int. Cl.$^5$ .............................................. H04N 17/04
[52] U.S. Cl. ........................................ 358/10; 324/404; 358/139; 358/903
[58] Field of Search .................. 358/10, 139; 324/404

[56] References Cited

U.S. PATENT DOCUMENTS

| 4,593,309 | 6/1986 | Uno | 358/10 |
| 4,897,721 | 1/1990 | Young | 358/139 |
| 4,925,420 | 5/1990 | Fourche | 445/3 |

*Primary Examiner*—Howard W. Britton
*Attorney, Agent, or Firm*—Philip M. Shaw, Jr.

[57] ABSTRACT

An adjusting apparatus for cathode ray tube equipment for convergence and/or image distortion adjustment which includes a pattern generator connected to a cathode ray tube to be measured and which generates a predetermined pattern having a plurality of bars and a white area, a probe attached to a front face of the cathode ray tube to be measured, and which includes a photo detector and a switch for starting measurement, an analog-to-digital converter connected to the probe, a measured data memory connected to an analog-to-digital converter for storing data received by the probe, a processor for controlling the pattern generator, receiving data from the measured data memory, and calculating the data according to various measurement routines.

16 Claims, 14 Drawing Sheets

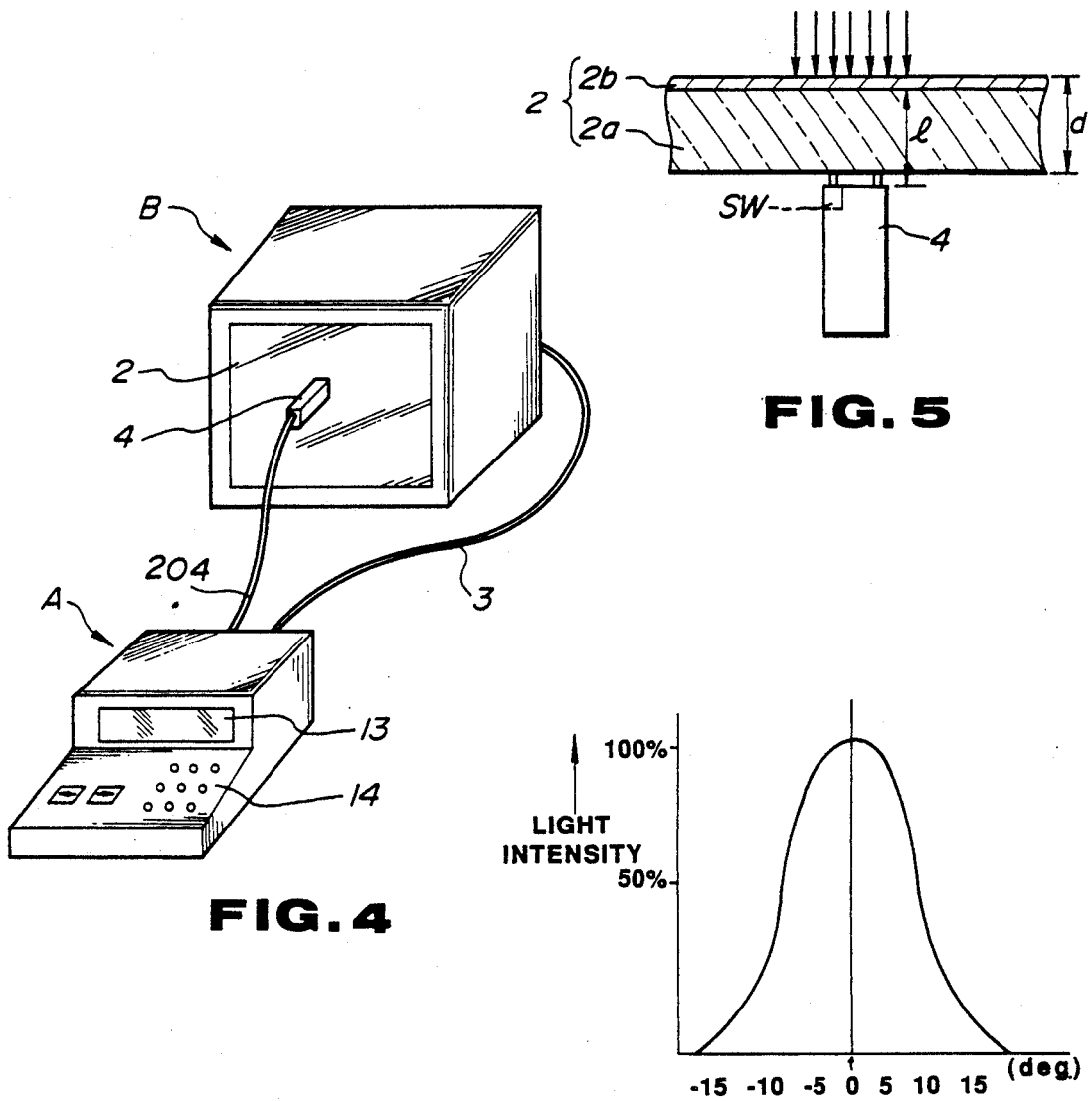

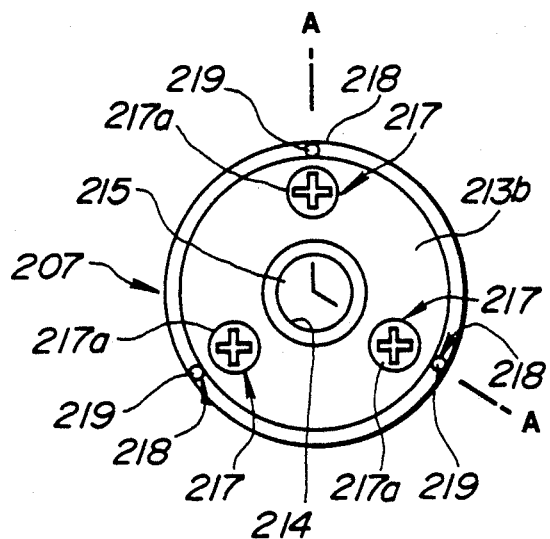
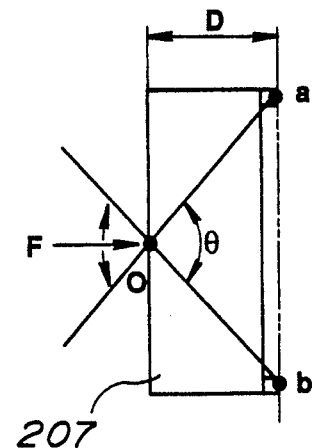
FIG. 29  FIG. 30A
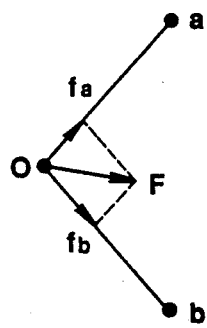
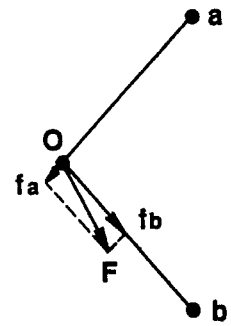
FIG. 30B  FIG. 30C

APPARATUS FOR TESTING AND ADJUSTING COLOR CATHODE RAY TUBE EQUIPMENT

BACKGROUND OF THE INVENTION (1) Field of the Invention

The present invention relates to an apparatus for adjusting characteristic parameters for a color CRT (abbreviation for Cathode Ray Tube) television receiver. Parameters including convergence, distortion of lines (also called bars) over time in a CRT, and image distortion at each line location.

The present invention relates, particularly, to an apparatus for measuring a convergence state of a color CRT television receiver and/or for measuring relative distortion (image distortion) at each line location in the color CRT and also distortion of the lines due to aging (deterioration with time) of the CRT.

(2) Description of the Background Art

Various types of convergence measuring apparatus of the phase detection type have been proposed which measure a convergence state of a color CRT television receiver.

One of the previously proposed convergence measuring apparatus described above is exemplified by Japanese Patent Application No. (Showa) 63-310670 filed on Dec. 8, 1988.

The previously proposed color CRT television receiver measuring apparatus includes a pattern generator, a photo sensor, and a calculator.

The pattern generator outputs a video signal to the color CRT for measurement. The pattern generator gradually shifts lines in the vertical or horizontal direction on an area of a tube face of the color CRT and generates a video signal which displays a white pattern on another area thereof.

The photo sensor, disposed opposing the tube face, has a directive sensitivity capability with uni-modal characteristic for detecting the light intensity values of each primary color from the CRT screen. Data detected by the photo sensor is output to the calculating means (calculator). The calculating means calculates a misconvergence quantity from the light intensity data of each primary color derived on the basis of the output of the photo sensor.

The photo sensor is disposed on an arbitrary position of the tube face of the color CRT. The pattern generator displays the lines for the respective primary colors on the tube face of the color CRT. The calculating means prepares an envelope curve for each primary color on the basis of the output of the photo sensor to derive the position of the peak value of each envelope curve and calculates a misconvergence quantity by comparing the positions of the peak values for each respective primary color.

The measurements of such misconvergence quantities as described above are carried out at a plurality of positions on the tube face of the color CRT by manually changing the position of the photo sensor on the tube face.

FIG. 2 shows the structure of a photo sensor as described above.

Referring to FIG. 2, the above-described photo sensor includes a casing 230 having an opaque main body casing 230a and a transparent glass 230b forming one end of the main body casing 230a.

A light receiving element 231 is disposed within the end of the casing 230, the light receiving element 231 detecting incident light via the transparent glass 230b, a face of the glass 230b being constituted as a contact face 232. Thus, the light receiving element 231 detects light emitted from the tube face 202 when the photo sensor is disposed so as to bring the contact face 232 thereof into tight contact with the tube face 202 of the CRT.

It is noted that it is necessary to measure the image distortion as well as convergence when television receivers are assembled.

Cathode Ray Tubes (CRT) display an image when fluorescent irradiating points emit light from the CRT tube face after being charged by an electron beam. Therefore, an appropriate image cannot be achieved when the direction of the electron beam is deviated from a desired position due to aging or other causes of deviation from the desired position. Hence, to correct such problems, lines in the vertical and/or horizontal direction are generated on the tube face of the CRT to measure distortion of lines over time (time distortion, or time lapse distortion) in the CRT and relative distortion (image distortion) at respective positions on the CRT tube face and to adjust the positions of lines on the basis of the measurement results so that no distortion occurs.

It is noted that for line distortion measurements, the positions of lines are measured with a scale arranged on the tube face or with a QC (Quality Control) scope.

The previously proposed convergence measuring apparatus has the following drawbacks.

Since the dimensions and thicknesses of tube faces are different in various makes and models of color CRTs, intervals between lines and the distance (refer to l in FIG. 5) between the irradiating points on the tube face and the photo sensor are different according to the make and/or model of the color CRT.

Therefore, since the directive sensitivity capability of the photo sensor has a constant unimodal characteristic, the difference between the detected maximum value and the detected minimum value of light intensity data becomes inaccurate in a case when the line interval with respect to the distance between the fluorescent screen and photo sensor is not held to a predetermined constant. An envelope curve derived by interpolation of the detected output of the photo sensor will be distorted with respect to a sinusoial waveform. When the envelope curve is distorted, the position of an accurate peak value cannot be calculated and an erroneous misconvergence quantity will be derived.

A white area is provided on the tube face (screen) of the CRT so as to suppress voltage variations in the area of the CRT 1 which is displaying color(s), to allow of more accurate measurement of color characteristics. It is noted that when lines of green (G), red (R), and blue (B) respectively, are displayed solely, the beam current voltage of the color CRT changes. Therefore, a positional change in the color electron peak occurs. Consequently, the white area needs to be provided to prevent voltage fluctuation during measurement of the CRT.

However, since measurements cannot be made on the white area of the tube face, it is necessary to change the location of the white area as different portions of the tube face are being tested. This operation is carried out by, e.g., an operator keying change data for the white area through a keyboard. Consequently, such measurements are time consuming and operation is troublesome.

Additionally, a longer time is also required to measure convergence. For example, the following measurement time is required to calculate a single misconvergence quantity during measurement; suppose that the number of samplings required to prepare the envelope curve of any one of green, red, or blue is S and a unit of time for line shift is t. The light intensity data for each of green, red, and blue is sampled. The measurement time for the misconvergence quantity of either the vertical or horizontal direction is expressed as follows:

T (measurement time) = 3 (three colors) × S (the number of samplings) × t (unit shift time).

In order to improve the measurement accuracy, it is necessary to increase the number of samplings (S).

However, an increase in the number of samplings mans an increase in the measurement time. An irrefutable relationship exists between measurement accuracy and measurement time.

Unit shift time (t), however, cannot be set any faster due to the functional limitations of such a measuring apparatus.

Furthermore, the brightness of lines is often reduced due to video frequency instability early in the measurement due to transient characteristics of the video circuit, the pattern generator and the color CRT, etc.

Therefore, initially, light intensity data is detected at a value lower than its actual value due to error in the detected output of the photo sensor (light intensity data). When error is present in the light intensity data, the position of a peak value derived from the light intensity data will be deviated and measurement accuracy is lowered.

In addition, the photo sensor of the previously proposed measuring apparatus has a number of drawbacks, a detailed explanation thereof will be made with reference to FIG. 2.

When the contact face 232 of the photo sensor is pressed against the tube face 202 of the CRT, the contact face 232 is inclined and contacted with the tube face 202a. If the horizontal axis n of the contact face 232 must be disposd so as to be vertical with respect to the tube face 202 it is troublesome for an operator to bring the contact face 232 into correct alignment with the tube face 232 due to the slightly rounded surface of most CRT screens. Once the contact face 232 is in tight contact with the tube face 202 of the CRT, the casing 230 may be easily displaced in the arrow-marked directions in FIG. 2 while being handled by an operator. The slight displacement causes variations in the positions of the contact face 232 and the light receiving element 231 such that the photo sensor may erroneously detect the position of the lines described above.

Finally, the previously proposed line distortion measuring apparatus has the following drawback, that is to say, measurement by scale and QC scope cannot measure line distortion with high accuracy since the operator must manually read a graduated scale affixed to the CRT which itself has a certain thickness. This, when coupled with the curved surface of the CRT can lead to misreading due to the operator's viewing angle, the portion of the screen being read, etc.

Since highly accurate CRTs are now demanded, the above-described prove increasingly inadequate. As the burdens of measurement and scale reading are imposed on the operator, it becomes desirable to find a way to measure line distortion in CRT equipment in the simplest, most efficient way possible.

SUMMARY OF THE INVENTION

It is an object of the present invention to provide an improved apparatus for measuring parameter characteristics of a color CRT which can overcome the above-described drawbacks.

According to one aspect of the present invention, there is provided an adjusting apparatus for cathode ray tube equipment, comprising: (a) a pattern generator, which generates a predetermined pattern including bars and a white area, is connected to a cathode ray tube under test; (b) a probe attached to a front face of the cathode ray tube under test and which comprises a switch for starting measurement and a photo detector for reading the light intensity of the CRT screen at the position of the probe and outputting a corresponding data signal; (c) measured data memory means connected to receive the output data signal of the probe for memorizing the data received from the probe; and (d) processor means which controls the pattern generator, receives data from the measured data memory, and calculates measurement data therefrom.

According to another aspect of the present invention, the predetermined pattern generates a plurality of lines with a predetermined space therebetween, and the probe is shaped or marked in accordance with a predetermined width between the bars.

According to still another aspect of the present invention, the processor is programmed to count a predetermined time interval after the processor means has received data from the previous data processing cycle. After the elapse of the predetermined time interval, a new data processing cycle begins and the probe becomes active to detect signals. The measured data memory means stores data, and the processor means receives the data from the measured data memory, completing the cycle, after which the timing step is again undertaken and the operation is repeated.

According to yet another aspect of the present invention, there is provided a frame which is attached to the front face of the cathode ray tube under test for mounting the plurality of probes. The processor means calculates positional differences of the probes from the predetermined pattern.

According to further aspect of the present invention, the probe further comprises a body including the switch, a light detector holder in which the photo detector is held movably around a pivot from the light detector holder, and pushing means between the switch and the light detector.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 4 is a overall perspective view of the arrangement for convergence measurement of the convergence measuring apparatus shown in FIG. 3.

FIG. 5 is a cross sectional view of a relationship between a CRT tube face to be measured and the photo sensor used in the preferred embodiment.

FIG. 6 is a characteristic graph of the directive sensitivity characteristic of the photo sensor used in the preferred embodiment.

FIG. 29 is an elevational view of the photo detecting probe shown in FIG. 28.

FIG. 30A is an explanatory view of an action of a force on a photo element holder portion of the photo detecting probe.

FIG. 30B is an explanatory view of an action of a force on the photo element holder portion of the photo detecting probe.

FIG. 30C is an explanatory view of an action of a force on the photo element holder portion of the photo detecting probe.

DETAILED DESCRIPTION OF THE PREFERRED EMBODIMENTS

Reference will hereinafter be made to the drawings in order to facilitate a better understanding of the present invention.

First, a preferred embodiment in which the present invention is applicable to a convergence measuring apparatus will be described with reference to the related drawings.

Figure 1:
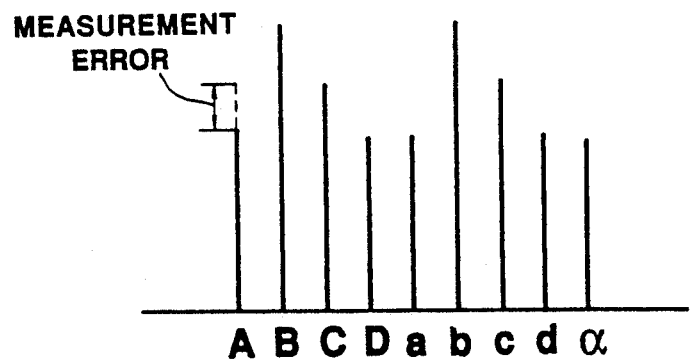
FIG. 1 is a characteristic graph of light intensity data including measurement error in a previously proposed measuring apparatus for color CRT equipment disclosed in a Japanese Patent Application (unpublished) No. Showa 63-310670.
Figure 2:
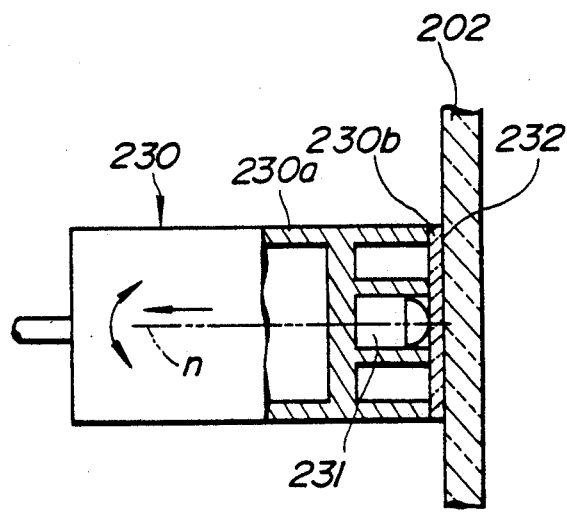
FIG. 2 is a schematic cross sectional view of a previously proposed photo sensor (probe) used in the measuring apparatus shown in FIG. 1.

It is noted that FIGS. 1 and 2 have already been explained in the description of the background of the art.

Figure 3:
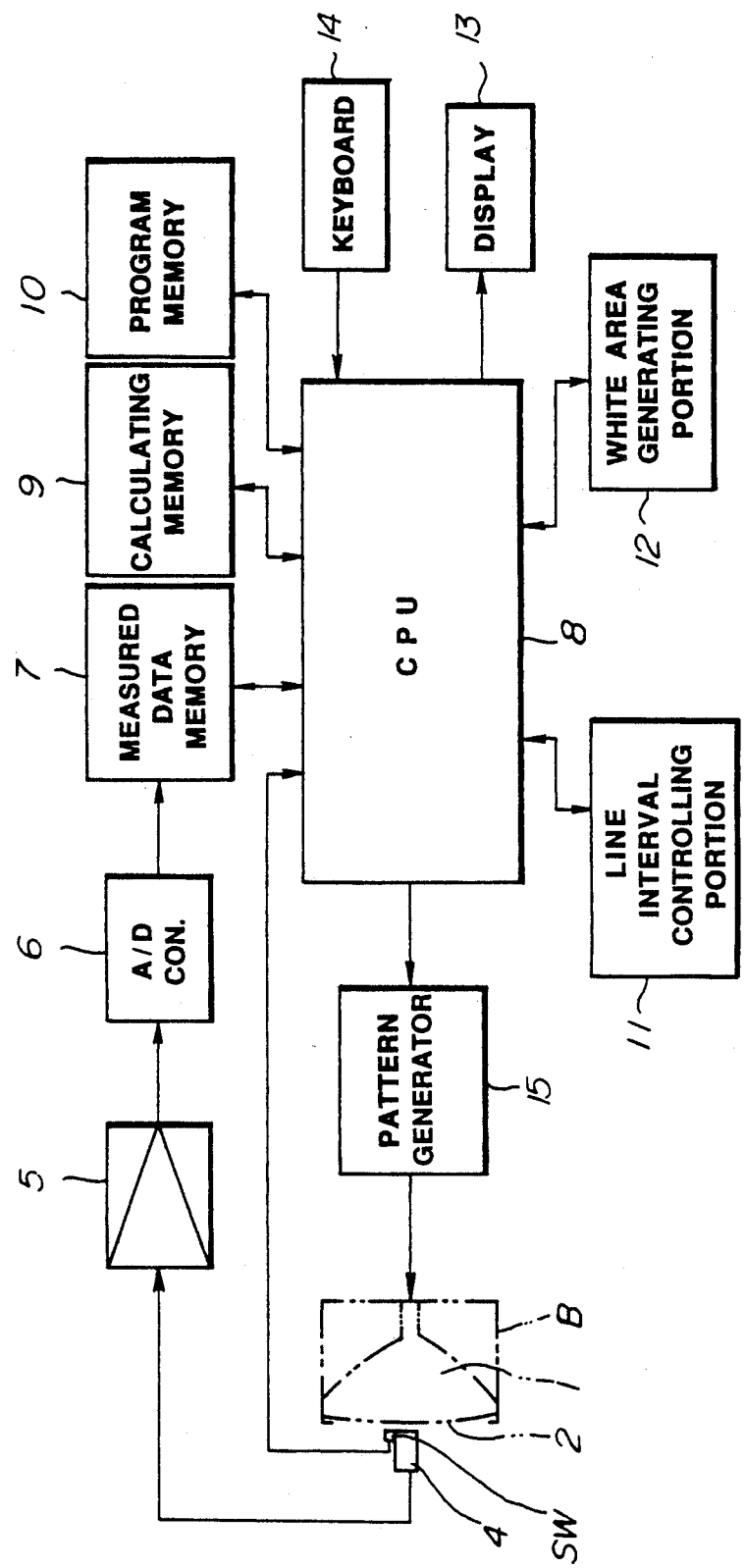
FIG. 3 is a circuit block diagram of a convergence measuring apparatus for color CRT equipment in a preferred embodiment according to the present invention.

FIG. 3 shows a circuit block diagram of a color CRT convergence measuring apparatus of the preferred embodiment. FIG. 4 shows the arrangement of the convergence measuring apparatus A in a measurement state according to the preferred embodiment. A color CRT (Cathode Ray Tube) 1 is incorporated into a television receiver B to be measured, the tube face 2 of the color CRT being exposed. A signal cable 3 of the convergence measuring apparatus A is connected to a video signal input terminal in the television receiver B so that a video image is displayed on the tube face 2 of the color CRT 1 in response to a video signal output from the convergence measuring apparatus. The convergence measuring apparatus A has a photo sensor 4 connected to a main body of the apparatus A via a cable. The photo sensor 4 is disposed so as to oppose the tube face 2 at a contact position on the tube face 2.

Figure 28:
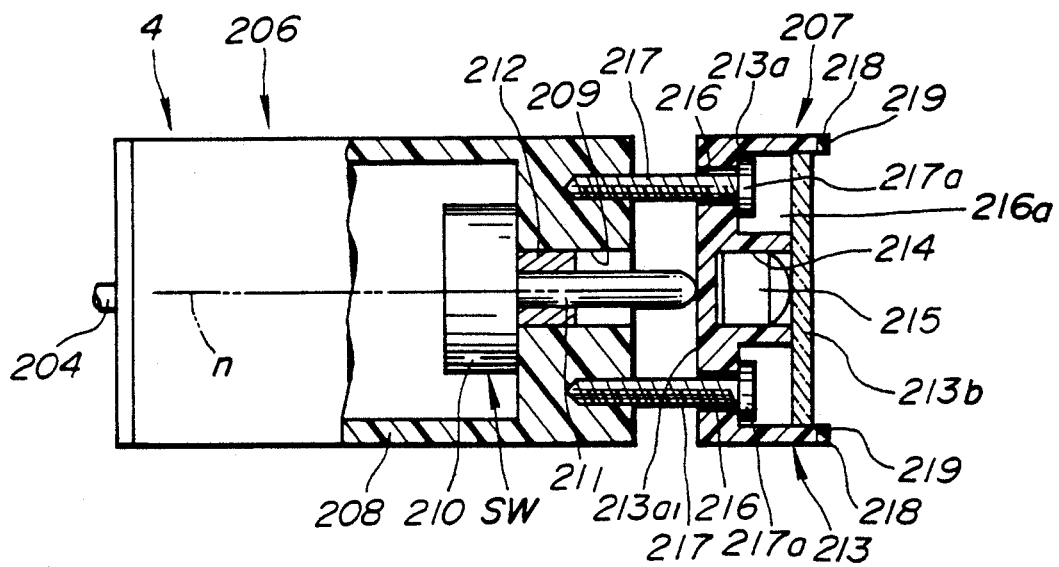
FIG. 28 is a vertical cross sectional view, with portions broken away of a photo detecting probe used in the preferred embodiments.

FIG. 28 shows a cross sectional view of the photo sensor 4 used in the convergence measuring apparatus shown in FIG. 4. FIG. 29 shows an elevational end view of the photo sensor 4 used in the convergence measuring apparatus shown in FIG. 4. The photo sensor includes a main probe bode 206 and a photo element holder portion 207 arranged at a tip of the photo main probe body 206.

The outer surface of the main probe body 206 is enclosed in a cylindrical casing 208 and a hole 209 is formed at a center of the tip of the casing 208. A signal processing circuit (not shown) is installed within the casing 208.

The output of the signal processing circuit is transmitted via a cable 204. In addition, a switch SW for activating the light receiving element 215 is fixed and arranged at the tip of the casing 208.

The switch SW includes a main switch body 210 and a switch rod 211 projecting from the main switch body 210. The switch rod 211 is movable and is biased in the fully extended direction by means of a spring (not shown). When the push switch SW is pressed downward against the spring force, the switch is turned on. The tip of the switch rod 211 retracts into the main probe body 206 through the hole 209. A bushing 212 is installed between the switch rod 211 and casing 208 in order to support the switch rod 211.

The photo element holder 207 is a cylindrical envelope having the same diameter as the main probe body 206. A casing 213 thereof includes an opaque main casing body 213a and a glass window 213b enclosing the tip of the main casing body 213a. A light receiving element chamber 214 containing a light receiving element 215 is formed within the casing 213. The light receiving element 215 receives incident light via the window 213b. The output of the light receiving element 215 is transmitted to the signal processing circuit.

Three screw holes 216 are formed on the side opposite to the window 213b of the photo detecting casing 213a at intervals of 120° of a center angle. Three screws 217 project from their corresponding screw holes 216 and the tip of each screw 217 is threaded into end of the casing 208 of the main probe body 206. Hence, movement of the screw 217 along a phantom axis n is limited to the range in which a head portion 217a of a screw 217 may slide within a screw head retaining cavity 216a created between the casing 213a and the window 213b. In addition, since the diameter of each screw hole 216 is formed so as to provide a clearance between the hole 216 and screw 217, the photo element holder portion 207 is constructed so as to enable a swinging motion with respect to a phantom axis n in a range corresponding to the extent to which the screw 217 can be moved according to the clearance provided in the screw inserting hole 216. This compensates for curvature of the CRT screen when the window 213b contacts it.

The tip of the switch rod 211 of the switch SW contacts with the center of the facing surface 213a of the photo sensor main body casing 213. The photo element holder 207 is pushed in a direction away from the main probe body 206 by means of the spring force of the switch rod 211. The switch rod 211 functions as a pushing means.

Forward facing projections 218 are installed on the edge of the annular front of the photo element holder 207, spaced equally at intervals of 120° around the circumference thereof, projecting slightly beyond the front surface of the window 213b. A rubber member is installed over each projection and the tip of the rubber member serves as a contact face 219 which contacts the face of a CRT to be tested. The contact face 219 makes positional error difficult since the contact face 219 is a rubber material having a high frictional resistance and contacts the tube face of a CRT so as to keep the photo element holder in a fixed positional relationship with respect to the tube face of the CRT.

Figure 31:
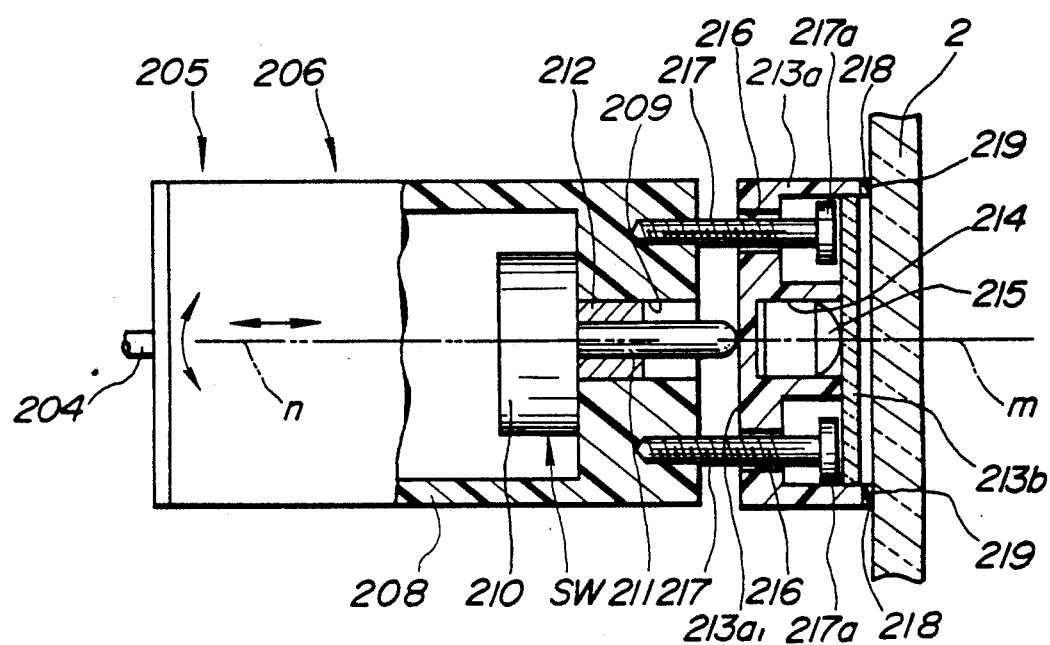
FIG. 31 is a vertical cross sectional view, with portions broken away, of the photo detecting probe depicted in FIG. 28 in an operational mode when contacted with a CRT face.

Operation of the above measuring apparatus will now be described. An operator grasping the main probe body 206, presses the contact face 219 against the tube face 2 of a CRT 1. As shown in FIG. 31, counter force from pressing against the stationary tube face 2 causes the photo element holder portion 207 to be displaced with respect to the main probe body 206. The switch SW is turned on by the switch rod 211 being pressed inward. With the contact face 219 pressed against the tube face 2 of the CRT, the photo element holder portion 207 is moved to a position in which the counter force from the tube face 2 and the pressing force F of the switch rod 211 are balanced. Therefore, the contact face 219 of the photo element holder portion 207 is pressed against the tube face 2 at the pressing force F of the switch rod 211.

Even if the phantom axis n of the main probe body 206 is not exactly perpendicular to the surface of the tube face 2, the axis of the photo element holder portion 207 will incline according to the clearance allowed by the screw holes 216, and the screw head retaining cavity 216a, so as to meet the surface of the tube face perpendicularly to maintain an accurate position for testing. Hence the photo sensor 4 is disposed in the correct detecting position.

In addition, even though the main probe body 206 may be displaced or inclined relative the phantom axis n, as shown by arrows in FIG. 31, due to handling movements or external vibrations, the photo element holder portion 207 is not affected by these disturbances since the photo element holder portion 207 is tiltable relative the main body holder 206 so as to maintain alignment with the phantom axis n with respect to the tube face 2 of the CRT.

Hence, since the contact face 219 is tightly pressed against the tube face 2, the light receiving element 215 is held stationary, therefore erroneous detection does not occur.

FIGS. 30 A–C show the action of a force F of the switch rod 211 imposed on the light element holder portion 207.

In FIG. 30 A, suppose that the width of the light element holder portion 207 is D, the point of application of the switch rod 211 is 0, points of reactions from the tube face 2 are a, b, and c (c not shown).

Since the direction of pressure F derived from the switch rod 211 coincides with the direction n of the phantom axis of the main probe body 206, compressive force is applied to all lines if the force F is applied within the range (central angle $\theta$) enclosed by lines $O_a$, $O_b$, and $O_c$ (not shown), in this condition all of the contact faces 219 will firmly contact the tube face 2. See also FIG. 30 B where the direction of pressure F is only slightly noncoincident with the direction n of the phantom axis.

In FIG. 30C however, a pressing force is applied out of the range (center angle $\theta$) enclosed by lines $O_a$, line $O_b$ and line $O_c$ (not shown). In this example, a tensile force is created along line $O_{fa}$, resulting in an insufficient compression force fb being exerted on line $O_b$, consequently the contact point 219 which corresponds to b will float from the tube face 2.

Hence, as the center angle $\theta$ becomes larger, the stability of the light element holder portion 207 is increased. Hence, it is preferable to reduce the width D of the photo element holder portion 207 or to widen intervals between the points a, b, and c. However, if the intervals between the points are widened substantially, it becomes difficult to measure at locations near the corners of the tube face 2 of the CRT 1 owing to the increased circumference of the photo element holder portion 207 which would result if the distances between the points a, b and c widened. Hence, it is preferable to reduce the width D of the light element holder portion 207 rather than increase its circumference.

Although the above described probe is applicable to a convergence measuring apparatus, the probe according to the present invention may be applied to any apparatus which carries out detection via contact with a surface.

Hence, the present invention is applicable to cases where measurement is made using a luminous element and a photo coupler as the photo element according to certain kinds of measurement.

FIG. 5 shows a cross sectional view indicating a positional relationship between a tube face 2 and the photo sensor 4. In FIG. 5, the tube face 2 has a fluorescent portion 2b disposed on the inner surface of the panel glass 2a. When the electron beam of the CRT irradiates the fluorescent portion 2b, the fluorescent portion 2b emits light.

Figure 18:
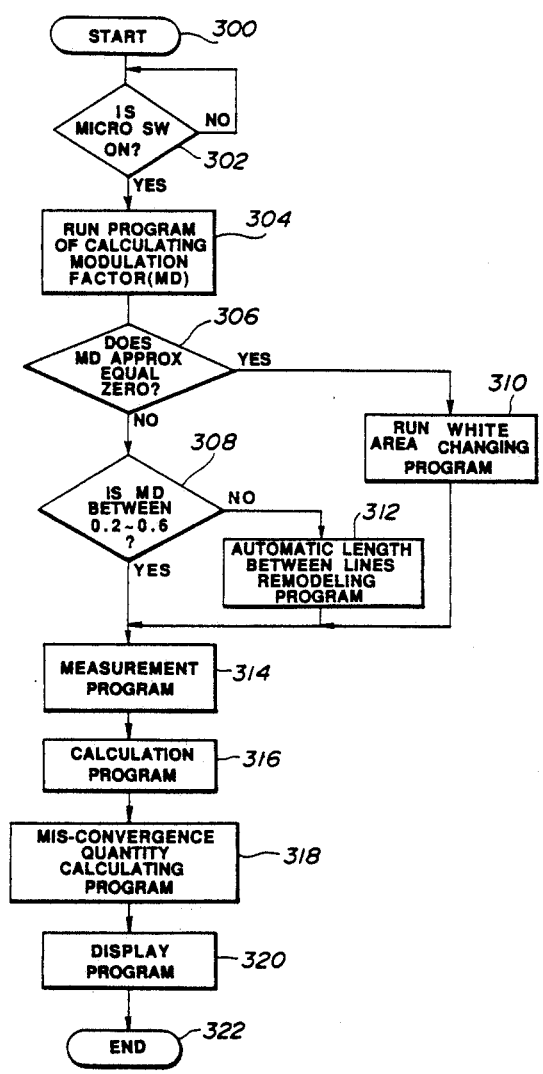
FIG. 18 is an operational flowchart for a measurement routine in the convergence measuring apparatus according to the present invention.

In addition, a microswitch SW installed on the photo sensor 4 is turned on when the photo sensor 4 is contacted with the tube face 2. Measurement is started in response to an ON signal from the microswitch SW. At this time, the operational flowchart shown in FIG. 18 is executed.

A diagram of the directive sensitivity characteristic of the photo sensor 4 is shown in FIG. 6. The horizontal axis denotes an incident angle (degree) of light incident on the photo sensor 4 from the tube face 2 of the CRT 1 and the vertical axis denotes the intensity of the incident light from the photo sensor 4 at each incident angle. The light intensity value defined as 100% is a relative value referring to an intensity of light received when the incident angle is 0°. As shown in FIG. 6, the directive sensitivity characteristic of the photo sensor 4 is maximum when the incident angle is 0°. As the absolute value of the incident angle becomes large, the light intensity becomes small. Therefore, the directive sensitivity characteristic of the photo sensor 4 is a so called, uni-modal characteristic, which indicates 0% when the absolute value of the detected incident angle is approximately 20°.

FIG. 3 shows a circuit block diagram of the color CRT testing and adjusting apparatus A. In FIG. 3, output from the photo sensor 4 (light intensity data) is introduced into an A/D converter 6 via an amplifier 5 and digitized by means of the A/D converter 6. The digitized light intensity data is written into a measured data memory 7 on the basis of a write signal derived from a CPU (Central Processing Unit) 8.

The CPU 8 controls the read and write of a calculating memory 9 and a program memory 10 as well as the measured data memory 7. The CPU 8 outputs a write control signal to the measured data memory 7 at a predetermined timing, corresponding to the frame switching interval of the video signal, in order to write the light intensity data from the photo sensor 4 into the measured data memory 7. However, during measurement startup, the CPU 8 outputs the write control signal only on receiving the second set of light intensity data (i.e., the output from a given line during its second video frame). The first line pattern output in the first frame during measurement startup is considered a dummy line and the output detected from the dummy line is excluded from the measurement data.

The calculating memory 9 stores the calculated data required when various kinds of data are processed. The program memory 10 stores data for executing the measurement program, modulation factor calculating program, white area change program, line interval automatic correction program, misconvergence quantity calculating program, and the display program.

The contents of each program will be described below.

The CPU 8 drives and controls a line interval controlling portion 11, a white area setting portion 12, and a display portion 13 in accordance with each program. It will be understood that each of such "portions" is a subroutine carried out by the CPU 8.

The CPU 8 includes a modulation factor calculating program and a misconvergence quantity calculating program. The modulation factor calculating program lists the maximum value MAX and minimum value MIN from among the light intensity data of a primary color (green, for example) measured at the initial stage and calculates the modulation factor F executing the equation; $F = (MAX - MIN)/(MAX + MIN)$.

If the value of the modulation factor falls in a range from 0.2 to 0.6 (FIG. 9), the CPU 8 determines that it is appropriate. If it is not in this range (FIG. 10), the CPU 8 determines that it is not appropriate. When the CPU 8 determines that it is not appropriate the modulation factor data is supplied to the line interval calculating portion 11. In the preferred embodiment, the modulation factor calculating program determines the modulation factor from the difference between the maximum value and minimum value of the light intensity data. However, the modulation factor F (MD) can be determined from the state of an envelope curve of the light intensity data (for example, the difference between the maximum value and minimum value of the curve and inclined angle).

If the value of the modulation factor is substantially zero, (indicating the sensor is positioned on the white area—FIG. 19) the CPU 8 transmits a white area change command to the white area setting portion 12.

The white area setting portion 12 specifies the white area of the screen. In the preferred embodiment, either a right half portion or left half portion of the tube face 2 is set as the white area. With a white area change command supplied from the CPU 8, white area data is output to the CRT which displays a white area position opposite the presently set area (FIG. 15).

Figure 15:
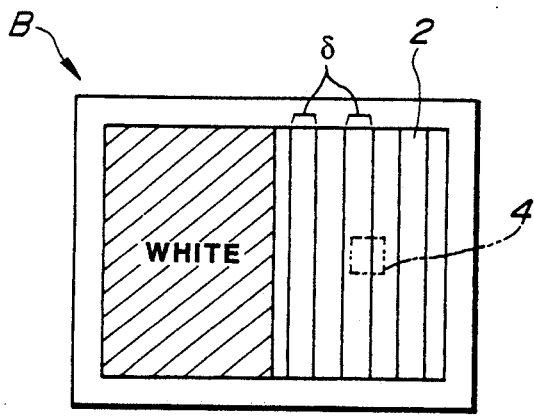
FIG. 15 is an elevational view of a CRT in which a white area and lines are displayed.

The line interval setting portion 11 outputs line interval data determining an interval δ between the lines displayed on the tube face 2 (FIG. 15). If the value of the modulation factor output from the CPU 8 is in the appropriate range of 0.2 through 0.6, line interval data is output which corresponds to the value of the modulation factor.

In a case where a line interval automatic correction program is not provided, the value of the modulation factor is displayed for manually correcting the line interval. In a case where the line interval has to be manually corrected, the appropriate data is input through the keyboard portion 14. Data input through the keyboard portion 14 can also be used to update data through the calculating memory 9 and the program memory 10.

The pattern generator 15 inputs the line interval data and white area data via the CPU 8. The pattern generator 15 also generates and outputs a video signal which respectively shifts a plurality of lines of the color being tested across the CRT tube face (screen) by 1/N per frame. The interval between each colored line in the display being maintained at a constant screen area interval of δ, in an area of the tube face other than the white area.

Figure 16:
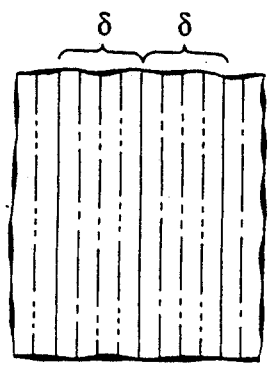
FIG. 16 is an elevational view of a CRT in which the lines are arranged without phase interlace.

That is to say, as shown in FIG. 16, the arrangement of lines is shifted 1/N per frame, advanced as in the positions denoted by the sequence of solid to dotted to double dotted to triple dotted lines.

Figure 17:
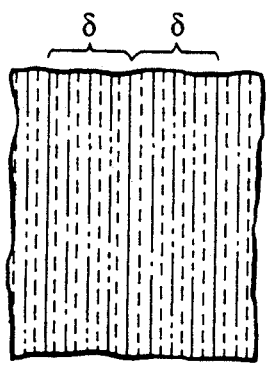
FIG. 17 is an elevational view of a CRT in which the lines are arranged with phase interlace.

In addition, such a line pattern can be prepared in two phases, A phase and B phase, in which line positions alternate, the line position of one phase being arranged adjacent the other. Specifically, suppose, for example, that the line solid positions shown in FIG. 17 are A phase and the intermediate line positions (dotted lines in FIG. 17) are the line positions of the of B phase, with the line patterns of both A and B phases being supplied respectively for the testing of each primary color (red, green, and blue constitute the primary colors for the subtractive color method used for color television and/or CRTs).

Figure 11:
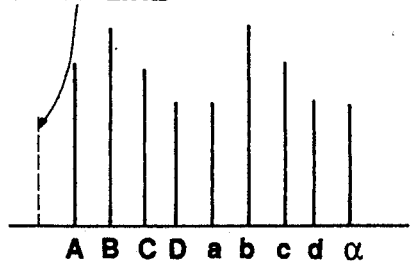
FIG. 11 is a characteristic graph of light intensity data received by the photo sensor including data generated from a dummy line in the measuring apparatus in the preferred embodiment.
Figure 12:
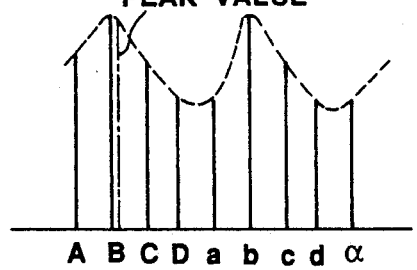
FIG. 12 is a characteristic graph of light intensity data received by the photo sensor at a certain phase (A phase) of a phase interlace.
Figure 13:
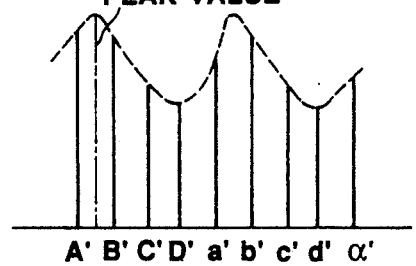
FIG. 13 is a characteristic graph of light intensity data received by the photo sensor at another phase (B phase) of the phase interlace.

For each primary color, the pattern generator 15 transmits alternate lines of each phase to the CRT 1. The pattern generator 15 repeatedly outputs the line pattern in this order. When the line pattern is generated on the tube face 2, the detected output of the photo sensor 4 is such that the light intensities at the time at which a frame is switched (A, B, C, D, a, b, c, d, α,—in FIGS. 11-14) indicate discrete light intensity data which exhibit characteristics similar to alternating current waveforms as shown in FIGS. 12 and 13.

Figure 7:
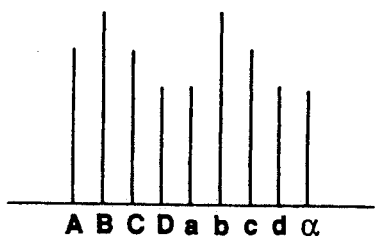
FIG. 7 is a characteristic graph of light intensity data for a CRT received by the photo sensor used in the preferred embodiment.
Figure 8:
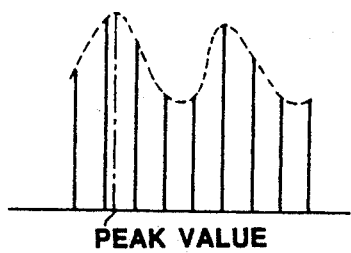
FIG. 8 is a characteristic graph of light intensity when a modulation factor (MD) of the light intensity from the CRT received by the photo sensor is appropriate.

The misconvergence quantity calculating program can interpolate discrete light intensity data (shown in FIG. 7) read from the measured data memory for conversion into a light intensity envelope curve which changes precisely as shown in the broken line of FIG. 8 to detect a point of time (position) at which the peak value of light intensity (envelope curve peak) for each primary color (green, red, and blue) is achieved.

The misconvergence quantity is the difference in the time in which a peak value of light intensity for red, green, and blue can be achieved.

In the preferred embodiment, the line pattern includes two phases, an A phase and a B phase. The misconvergence quantity calculating program carries out arithmetic averaging of the misconvergence quantity of the presently input phase in relation to the previously input misconvergence quantity to calculate an average misconvergence quantity. Therefore, the misconvergence quantity calculating program calculates an average misconvergence quantity by arithmetically averaging the misconvergence quantity in the case of the presently measured A (or B) phase and that of the previously measured B (or A) phase.

The photo sensor 4 can be placed at an arbitrary position on an area of the tube face 2 of the color CRT 1 other than the white area. The measurement time can principally be four frame intervals. In addition, the pattern generator 15 can generate lines in the vertical or horizontal direction.

The action of the above-described CRT testing and adjusting apparatus will be explained with reference to an operational flowchart of FIG. 18.

Figure 19:
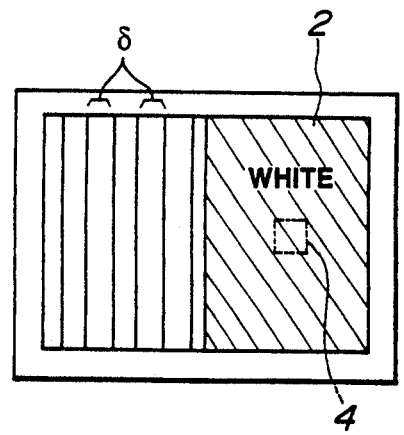
FIG. 19 is an elevational view of a CRT when a positional relationship between the white area and lines is changed according to an activation of white area change program.

Beginning at step 300, when the photo sensor 4 is brought into contact with the tube face 2 of the CRT 1, the microswitch SW is turned on. In response to the ON signal of the microswitch at step 302, the CPU 8 first executes the modulation factor calculating program at step 304. That is to say, the control signal of the CPU 8 causes the line interval data of the line interval calculating portion 11 and the white area data of the white area setting portion 12 to be transmitted to the pattern generator 15. The pattern generator 15 generates a video signal on the basis of this data. Upon startup of the pattern generator 15, a green line of the A phase is the initial frame displayed on the tube face 2, arranged on an area of the tube face other than the white area as shown in FIG. 19.

While the line is shifted at each frame, the light intensity data for each shift (refer to FIG. 12) is fetched into the measured data memory 7.

The CPU 8 does not output the write signal when the first line pattern light intensity data is fetched after the start of measurement. Only the second and subsequent light intensity data after the start of measurement is written into the measured data memory 7, as shown in FIG. 11. At least four frames of light intensity data are required to calculate the modulation factor. When green light intensity data ($G_1$, $G_2$, $G_3$,—) of at least four frames is fetched, the modulation factor calculating program calculates the modulation factor of the light intensity data.

Figure 20:
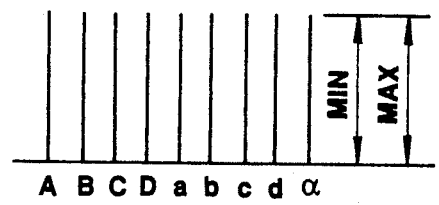
FIG. 20 is a characteristic graph of light intensity data received by the photo sensor in a case where the photo sensor is disposed on the white area.

At step 306, if the CPU 8 determines that the value (MD) of the modulation factor is substantially zero (sensor is on the white area), the white area change program is initiated at step 310 to change the white area position. That is to say, in a case where the photo sensor 4 is arranged on the white area (FIG. 15), the light intensity data indicates that all data values are substantially the same as shown in FIG. 20 and the value of the modulation factor is substantially zero. Then, a white area change command is supplied from the modulation factor calculating program to the white area setting portion 12 at step 310. The white area setting portion 12 supplies white area data different from those derived so far to the pattern generator 15 so that the video display on tube face 2 is switched as shown by comparing FIGS. 15 and 19.

Figure 9:
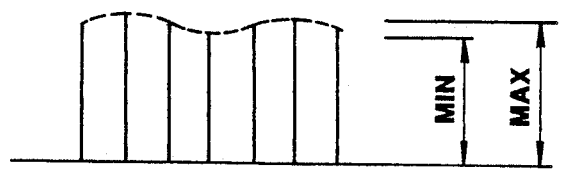
FIG. 9 is a characteristic graph of light intensity when the modulation factor (MD) of the light from the CRT received by the photo sensor is relatively small.
Figure 10:
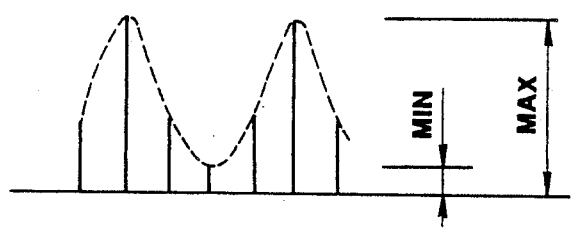
FIG. 10 is a characteristic graph of light intensity when the modulation factor (MD) of the light from the CRT received by the photo sensor is relatively large.

At step 308, the CPU 8 determines if the value (MD) of the modulation factor is between 0.2 and 0.6. If not, the line interval automatic correction program is initiated at step 312 to correct the line interval δ. For example, in a case where the photo sensor 4 measures an area other than the white area as shown in FIG. 15, and the line interval δ is narrower than an appropriate value, the light intensity data would read as shown in FIG. 9 indicating that the value of the modulation factor is below 0.2 (0.1, for example). On the contrary, in a case where the line interval δ is wider than the most appropriate (optimum) value, the light intensity data would read as shown in FIG. 10 that the value of the modulation factor is above 0.6 (0.7, for example).

In each of these cases the value of the modulation factor is supplied by the CPU 8 at step 312 to the line interval calculating portion 11 so that an appropriate line interval δ can be calculated, according to the value of the modulation factor, and supplied to the pattern generator 15.

Upon completion of the white area change program at step 310 and line interval automatic correction program at step 312, if the value of modulation factor (MD) falls in the range of 0.2 through 0.6, the routine is transferred to the measurement program at step 314 without initialization of other programs.

In the measurement program, lines of green, red, and blue are displayed on the tube face 2 in that order. The measured data memory 7 stores the detected light intensity data as shown in FIG. 7 for each of the green, red, and blue lines. The order of measurement (by frame) for green, red, and blue in the preferred embodiment are: green, $G_1$—$G_2$—$G_3$—$G_4$—. Thereafter, red, $R_1$—$R_2$—$R_3$—$R_4$—, and finally, for blue, $B_1$—$B_2$—$B_3$—$B_4$. This order is adopted for testing convenience, however, a measurement sequence of $G_1$—$R_1$—$B_1$—$G_2$—$R_2$—$B_2$—$G_3$—$R_3$—$B_3$, can also be implemented to reduce jitter at low frequencies (by several times 10 Hz).

If the value of the modulation factor for the initially displayed green frame in the modulation factor calculating program falls in the range of 0.2 through 0.6, the light intensity data of green is directly adopted as a true value thereof so that the measurement program continues measurement only for red and blue.

Next, the misconvergence quantity calculating program is executed at step 318. The misconvergence quantity calculating program calculates the difference between a time position at which a peak green light intensity of is achieved and the time positions at which peaks for red and blue light intensities are achieved, i.e., the misconvergence quantity ($A_1$).

Since calculation of the misconvergence quantity begins after the first frame of measurement, in which the brightness of the line would be less than the true value as explained in the background of the art, an accurate misconvergence quantity can be derived.

When the first misconvergence quantity ($A_1$) is calculated, the display program is executed and the misconvergence quantity is displayed at step 320 on the display portion 13. As will be explained hereinafter, this sequence is repeated for each color and phase. Thereafter, the CPU 8 ends this program at step 322.

Unlike the measurement program, which is concerned only with light intensity, during calculation of the misconvergence quantity, lines of each phase must be considered separately as well as the combined light intensities of the three primary colors. Therefore, in the preferred embodiment the display outputs a series of green, red and blue lines on the screen simultaneously. The measurement cycle (4 frames) is as follows: lines of $G_1$ (A phase), $R_1$ (A phase), $B_1$ (A phase) are output for 4 frames; followed by, $G_2$ (B phase), $R_2$ (B phase), $B_2$ (B phase) in the next four frames, and; 4 frames of $G_3$ (A phase), $R_3$ (A phase), $B_3$ (A phase), then; another 4 frames of $G_4$ (B phase), $R_4$ (B phase), $B_4$ (B phase). This can be continued as necessary.

Upon completion of the first measurement cycle, (4 frames of 6, R, and B of the A phase), the pattern generator 15 displays the next cycle, which is a line pattern of the B phase. This light intensity data (refer to FIG. 13) is fetched into the measured data memory 7. Thereafter, a second misconvergence quantity ($B_1$) is calculated on the basis of the B phase light intensity data.

In addition, the misconvergence quantity calculating program calculates the equation of $(A_1+B_1)/2$ to derive an average misconvergence quantity, the average misconvergence quantity also being displayed on the display portion 13.

It is noted that in a case where during the calculation of the average misconvergence quantity, an abnormal value may be indicated due to unexpected motion of the photo sensor 4, this misconvergence data is not added to the average data.

In this way, when the third measurement (line pattern of A phase), fourth measurement (line pattern of B phase),—and so on, are carried out, the measurement result are displayed as shown in the following table on the display portion 13.

TABLE

| | AVERAGE Misconvergence QUANTITY |
|---|---|
| First | $A_1$ |
| Second | $B_1 ((A_1 + B_1)/2)$ |
| Third | $A_2 ((B_1 + A_2)/2)$ |
| Fourth | $B_2 ((A_2 + B_2)/2)$ |
| — | — |

Figure 14:
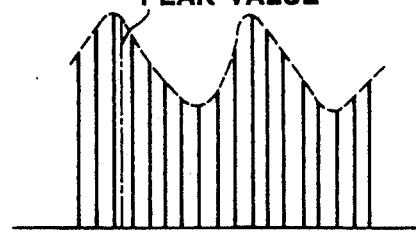
FIG. 14 is a characteristic graph of light intensity data in a case where the number of samplings is two, due to phase interlace.

Since the average misconvergence quantity is, as shown in the TABLE, derived for each measurement of each phase, misconvergence data can be compiled in a short period of time. Then, although the first measurement indicates only the misconvergence quantity derived from the A phase line pattern (four samplings), the average misconvergence quantities are, thereafter, derived from the line patterns of A phase and B phase (eight samplings). Consequently, the average misconvergence quantities obtained use twice as many samplings as light intensity measurements (as shown in FIG. 14) and very accurate data thereof can be achieved.

It is noted that the misconvergence quantity can be displayed on the color CRT 1 to be measured. The horizontal and vertical misconvergence quantities can be measured by measuring the line state in both the horizontal and vertical directions, according to the output of the signal generator, without moving the photo sensor 4 from its position on the tube face 2.

It is noted that although, in the preferred embodiment, the pattern generator 15 generates line patterns of two phases A phase and B phase, the pattern generator 15 can be made to generate line patterns of more than two phases (A phase, B phase, and C phase,—). In this case, the average misconvergence quantity is calculated using the equation of $(A+B+C+-)/2$.

It is also noted that although in the preferred embodiment the white area setting portion 12 is constructed so as to set either one of the right half portion or the left half portion of the tube face 2 as the white area, a range which is sufficient to suppress voltage variations of the color CRT 1 except at the point at which the photo sensor 4 is arranged can be set as the white area. Therefore, dimension and location of the white area is widely variable.

Furthermore, although in the preferred embodiment the pattern generator 15 generates a plurality of lines at constant intervals, only a single line can be displayed and the single line can gradually be shifted by a predetermined quantity (distance).

Although, in the preferred embodiment, the write signal supplied by the CPU 8 to the measured data memory 7 is controlled so that the first line after the start of measurement is considered a dummy line, light intensity data from the first frame of measurement is nevertheless fetched into the measured data memory 7 without control of the write signal of the CPU 8. However, this data is not used for the calculation of the misconvergence quantity.

There can also be various alternative means which can be provided to regard the line(s) in the first frame of measurement as a dummy line.

In addition, although in the preferred embodiment, only the first frame after the start of measurement is a dummy line, two or more frames after the start of measurement can serve as dummy lines according to the user's requirements, with the circuit characteristics of the video circuit and color CRT 1 of the pulse generator 15 taken into account.

It is also noted that when, in the preferred embodiment, an ON signal of a microswitch SW is input, the CPU 8 immediately executes the modulation factor calculating program. However, the modulation factor calculating program can be delayed, to be executed 0.1 through 0.5 seconds after the ON signal is inputted.

Since the photo sensor 4 is stably positioned at a position on the tube face 2 when the ON signal of the microswitch SW is inputted, erroneous measurement can be prevented.

Figure 21:
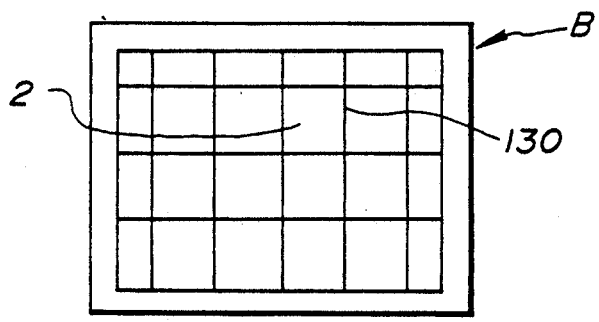
FIG. 21 is an elevational view of a pattern displayed on a CRT in a case where sensitivity calibration according to the invention is carried out.

FIG. 21 shows a front view of the CRT 2 of a television receiver B when a sensitivity calibration is carried out.

In FIG. 21, if a sensitivity calibration program is selected through a key of a keyboard portion 14, the sensitivity calibration program is executed so that line patterns 130 at appropriate intervals in the vertical and horizontal directions are displayed on the tube face 2 of the CRT 1 (each interval is ten times the line interval $\delta$ at the time of measurement program). Each line interval is measured and the measurement data is input through the keyboard 14.

Figure 22:
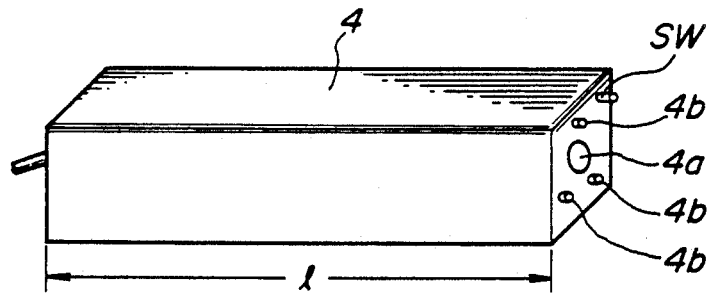
FIG. 22 is a perspective view of a photo sensor used for sensitivity calibration.
Figure 23:
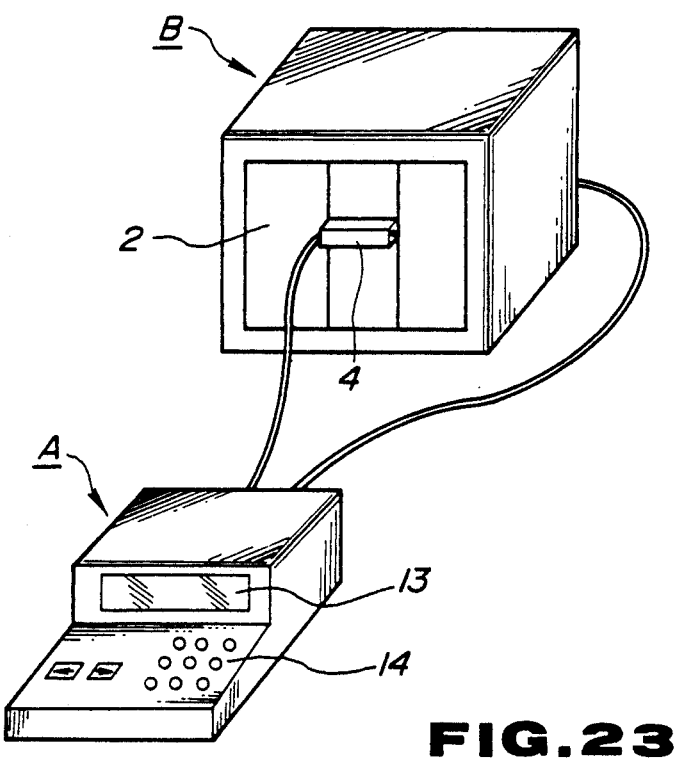
FIG. 23 is an elevational view of a CRT when a line pattern is displayed by means of a line distortion measuring apparatus according to the present invention.

FIGS. 22 and 23 show modifications of other sensitivity calibrating means. The length of the photo sensor 4 is formed at a constant dimension as shown in FIG. 22. When the sensitivity calibrating program is selected, two longitudinal lines are displayed on the tube face 2 of the color CRT 1. In addition, one of the two lines can be shifted in the right and left directions through a shift key 1a on the keyboard portion 14.

However, as shown in FIG. 23, when the sensitivity calibrating program is selected through a key of the keyboard portion 14, two lines are displayed on the tube face 2 of the CRT 1. Next, when the photo sensor 4 is pressed lengthwise against the tube face 2 as shown in FIG. 23, one line is moved through the shift key 14a so that two lines are respectively positioned at either side of the contact surface of the photo sensor 4. That is to say, the length of the photo sensor 4 is used as a unit of measurement.

Additionally, since the light receiving face 4a is formed on the detecting face of the photo sensor 4 as shown in FIG. 22, three supporting pads 4b are projected on an outer periphery of the light receiving face 4a. Since each supporting pad 4b is formed of a rubber material, the photo sensor 4 will not be deviated when contacted with the tube face 2.

Next, another preferred embodiment in which the present invention is applied to line distortion measurement will be explained with reference to the related drawings.

Figure 24:
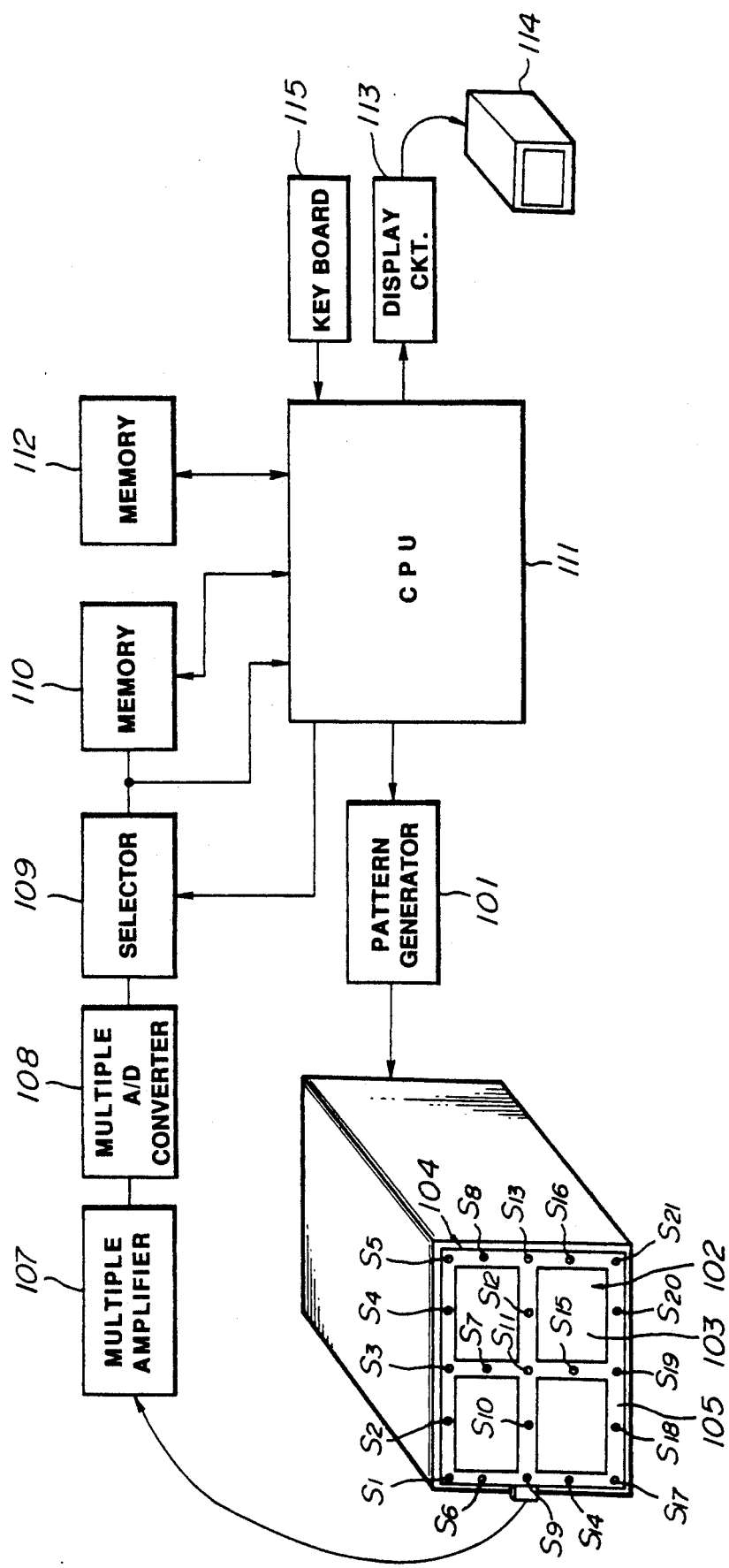
FIG. 24 is a circuit block diagram of a line distortion measuring apparatus according to the present invention.

FIG. 24 shows a rough sketch and block diagram of the line distortion measuring apparatus in this preferred embodiment.

Figure 25:
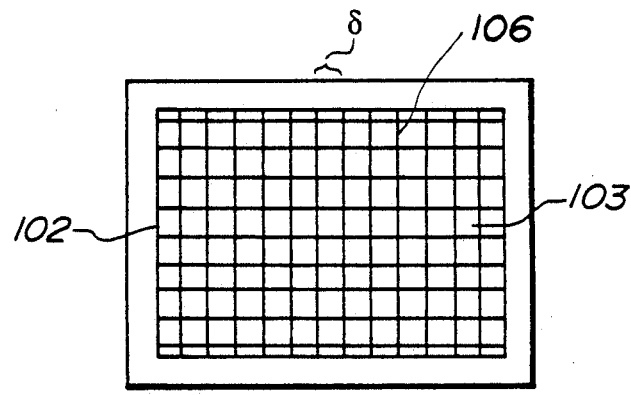
FIG. 25 is an elevational view of a CRT in which a line pattern is displayed by means of a line distortion measuring apparatus in a preferred embodiment according to the present invention.

In FIG. 24, the pattern generator 101 receives line interval data from the CPU 111. At this time, the pattern generator 101 generates a video signal of a line pattern 106 (as shown in FIG. 25) such that bars are arranged at constant intervals $\delta$ in both the horizontal and vertical directions, forming a grid pattern and outputs the video signal to the CRT (Cathode Ray Tube) 102.

The CRT 102 to be measured/adjusted can be built-in to a television receiver and a light portion 104 is attached onto the tube face 103 of the CRT 102.

The light detecting portion 104 has the same outer diameter as the tube face 103 and has a frame body 105 in a quartered rectangle shape, i.e., a square frame quartered by two cross-pieces set perpendicularly to each other. A plurality of photo sensors $S_1$ through $S_{21}$ are fixed on the frame body 105 at constant intervals. The photo sensors $S_1$ through $S_{21}$, held by the frame 105, are arranged at accurate intervals provided in straight lines both horizontally and vertically along the tube face 103. In addition, each photo sensor $S_1$ through $S_{21}$ is arranged so as to make tight contact therewith (refer to FIG. 5).

The output signal (light intensity data) of each photo sensor $S_1$ through $S_{21}$ introduced into a multiple A/D converter 108 via a multiple amplifier 107. The multi-amplifier 107 and multi-A/D converter 108 amplify and digitize the detected output signal of each photo sensor simultaneously and supply each digitized light intensity data to a selector 109. When an output control signal is supplied from the CPU 111 to the selector 109, each digitized input light intensity data is selected in a constant sequence. All of the light intensity data is serially supplied to a memory 110 and a CPU 111.

Writing and reading to and from the memory 110 is controlled on the basis of write and read control signals supplied by the CPU 111.

Similarly, the write and read to and from another memory 112 is controlled through the CPU 111. The memory 112 stores arithmetic operation data necessary for arithmetic processing of each kind of data, as well as program data for executing a time distortion measurement program and an image distortion measurement program.

The contents of the respective programs described above will be explained below.

The CPU 111 is programmed to carry out the above-described functions as well as time quantity calculating program and line position calculating program.

The time distortion quantity calculating program calculates a difference between reference data and comparison data. All reference light intensity data supplied is measured first and supplied to memory 110. Comparison data is measured in a second measurement cycle and supplied to memory 112. The difference data is supplied to the display circuit 113 together with line position data, for display on the tube face 103.

The line position calculating program derives line position with respect to each photo sensor $S_1$ through $S_{21}$ and from the light intensity data (measurement data) fetched into the memory 110. Specifically, the distance data is calculated on the basis of the converted data stored in the memory 112 (data corresponding to the light intensity data and to the distance from each photo sensor to the displayed line). The distance data is supplied to a display circuit 113 together with the positional data to be displayed on the tube face 103.

Alternatively, the line position calculating program can calculate the difference data with respect to reference data supplied from one of the photo sensors, $S_1$ through $S_{21}$ arranged in a straight line on the tube face, and can supply the difference data and positional data to the display circuit 113.

The display circuit 113 generates a video signal to display the supplied positional data and difference or distance data in a numerical form or figure form. In addition, a signal is input from a keyboard 115 into the CPU 111. The keyboard 115 serves to command measurement start/end and to select the time distortion measurement program or image distortion measurement program.

The operation of the above-described line distortion measuring/adjusting apparatus will be described below.

Figure 26:
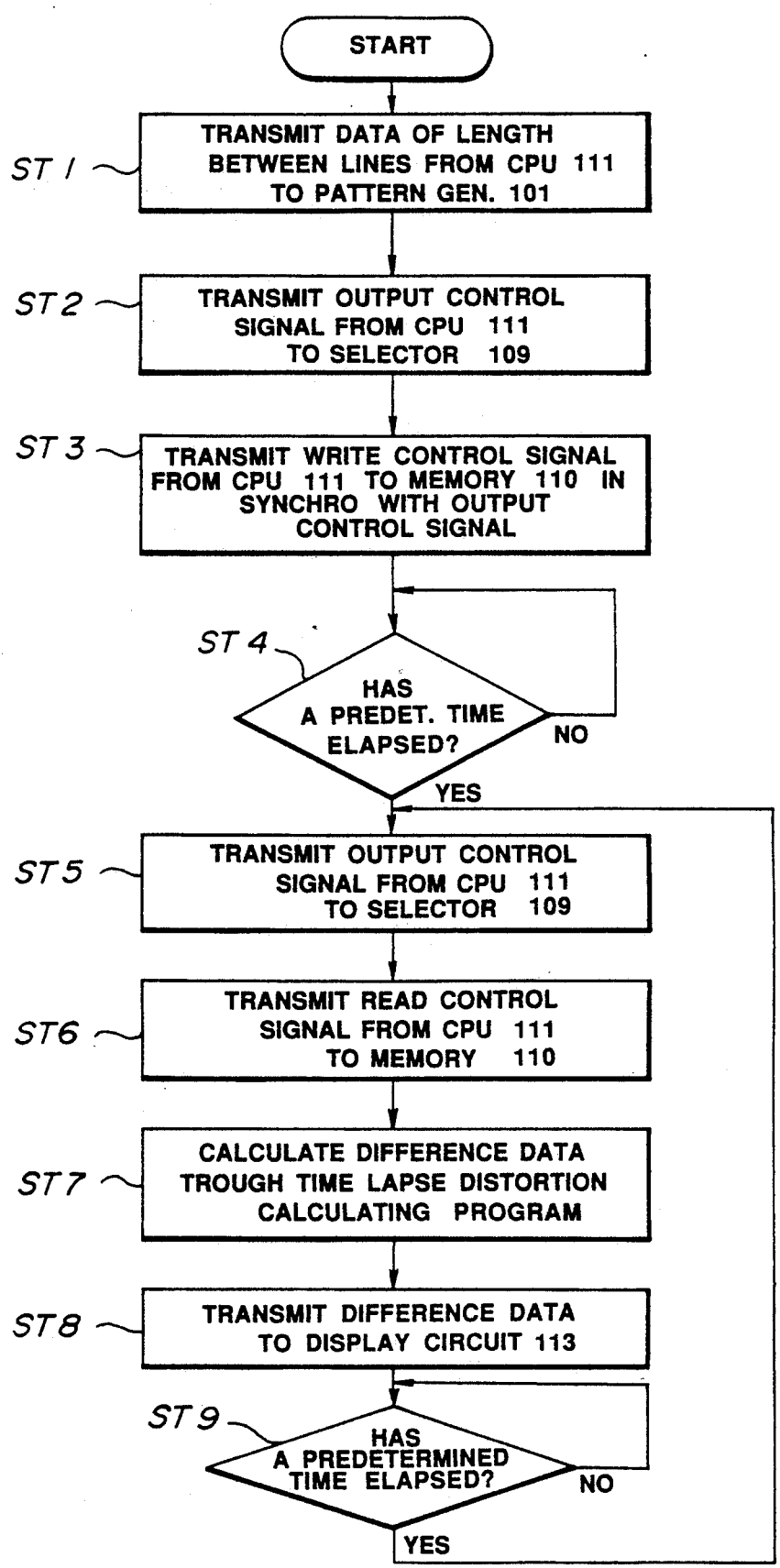
FIG. 26 is an operational flowchart of a time lapse effect measuring apparatus in another preferred embodiment according to the present invention.

As shown in the program flow chart of FIG. 26, when the operator uses the keyboard 115 to select the time distortion measurement program, the CPU 111, at step ST 1 transmits the line interval data to the pattern generator 101 so that the line pattern 106 is displayed on the tube face 103 of the CRT 102 (refer to FIG. 25). Each light sensor $S_1$ through $S_{21}$ detects light emitted from a single (adjacent) line. Each detected output (light intensity data) is introduced into the selector 109 via a multi-amplifier 107 and via a multi A/D converter 108.

Next, at step ST 2, when the CPU 111 outputs an output control signal to the selector 109, the selector 109 outputs the light intensity data in a constant order to the memory 110 and CPU 111 (in, for example, the output orders of the light intensity data from each photo sensor, i.e., $S_1$—$S_2$—$S_3$ —).

At step ST 3, the CPU 111 outputs a write control signal to the memory 110 in synchronization with the output control signal without writing light intensity data thereinto. Thereafter the light intensity data of each photo sensor $S_1$ through $S_{21}$ written into memory 110 in constant order.

When a constant time t has elapsed at step ST 4 upon the end of the reference measurement, the CPU 111 again outputs the output control signal to the selector 109 at step ST 5. The selector 109 outputs the light intensity data to the memory 110 and the CPU 111 in the same order as described above.

The CPU 111 derives the comparison light intensity data after a constant time t has passed, but this data is not stored into the memory 110 but only by the CPU 111. When fetching of the light intensity data is ended, the CPU 111 outputs the read control signal at step ST 6 into the memory 110 so that the light intensity data is also fetched into the CPU 111.

At step ST 7 the CPU 111 runs an age distortion quantity calculating program which calculates the difference between the reference data and the comparison data. The light intensity data read from the memory 110 is the reference data and the light intensity data derived from the selector 109 is the comparison data. The difference between the reference data and the comparison data is thus with reference to the same photo sensors $S_1$ through $S_{21}$ in the same input order.

The positional data (positions of the photo sensors $S_1$ through $S_{21}$ on the tube face 103 and the difference data are output to the display circuit 113 at step ST 8.

At step ST 9, the CPU 11 determines if the constant time t has elapsed in the comparison measurement, i.e., a time 2t has elapsed since initiation of the reference measurement. If so, the CPU 111 returns to step ST 5 and again outputs the output control signal to the selector 109 and calculates the difference data in the same way as described above. When the above-described action is repeated, the line position change for the constant time t can be displayed on a monitor 114 in real time. It is noted that if no time distortion is present, the difference data indicates zero. In addition, if time distortion occurs due to geomagnetism or temperature drifts in other circuit elements, the difference data indicates values other than zero. As the distortion quantity becomes large, its absolute value indicates a larger value.

The change in the difference data thus indicates a time distortion change.

Figure 27:
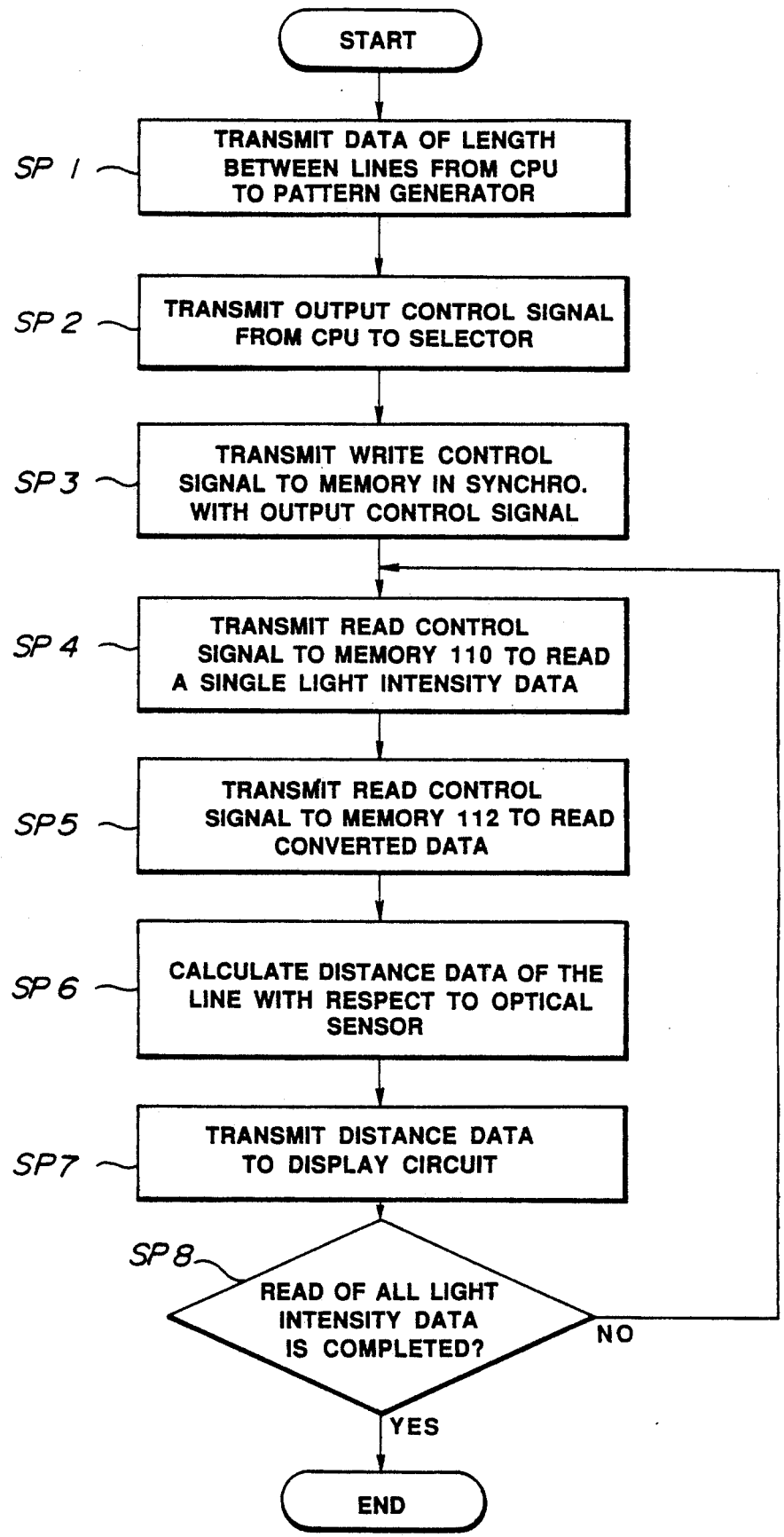
FIG. 27 is an operational flowchart of the line distortion measuring apparatus in the preferred embodiment according to the present invention.

As shown in FIG. 27, when the image distortion measurement program is selected through the keyboard 115, the CPU 111 at step SP 1 transmits the line interval data to the pattern generator 101, the line being displayed on the tube face 103 of the CRT 102 (refer to FIG. 25). Each photo sensor $S_1$ through $S_{21}$ detects light emitted from a single (adjacent) line. Each detected output (light intensity data) is introduced into the selector 109 via a multi-amplifier 107 and multi-A/D converter 108. Next, at step SP 2, the CPU 111 outputs an output control signal to the selector 109. The selector 109 outputs the light intensity data in a constant order (for example, in the order of the outputs of the photo sensors $S_1$—$S_2$—$S_3$). The CPU 111 does not fetch to itself the light intensity data but instead outputs a write control signal to the memory 110 in synchronization with the output control signal at step SP3. The light intensity data of each photo sensor $S_1$ through $S_{21}$ is then written into the memory 110. Upon completion of all writing of light intensity data, the CPU 111 to the memory 110 to read the light intensity data of a single photo sensor (for example, the light intensity data of the photo sensor $S_1$), and at step SP 5 outputs a read control signal to the memory 112 to read the conversion data.

The line position calculating program calculates distance data from the conversion data for the light intensity data (measurement data) at step SP 6. The distance data and positional data (position of the photo sensor $S_1$) on the tube face 103 is output to the display circuit 113 at step SP 7. Upon completion of the output of the data to the display circuit 113, the CPU 111 determines at step SP 8 if all of the light intensity data has been read. If not, the process returns to step SP 4 to read subsequent light intensity data (for example, the light intensity data of the photo sensor $S_2$) and calculate distance data according to the same process for all sensors.

A monitor 114 displays the line positions of the respective photo sensors $S_1$ through $S_{21}$. It is noted that if the lines are displayed as straight lines no image distortion occurs. Therefore, the distance data of a group of the photo sensors placed in a straight line (for example, a group of $S_1$, $S_2$, $S_2$, $S_3$, $S_4$, and $S_5$ or a group of $S_1$, $S_6$, $S_{14}$, and $S_{17}$) indicates a constant value.

A curved line is displayed when image distortion occurs due to magnetic field leakage within the chassis, such as from an FBT (Fly-Back Transformer) or the like. If the distance data of a group of photo sensors placed in the straight line do not display as a constant value due to the change in the distance data, an image distortion state is recognized.

In the preferred embodiment, the plurality of photo sensors $S_1$ through $S_{21}$ are arranged in straight lines in the horizontal and vertical directions. In the case where time distortion is to be measured, the photo sensors $S_1$ through $S_{21}$ can be positioned at arbitrary positions or alternatively be positioned at a single arbitrary position.

In addition, although in the preferred embodiment measurement of lines in the horizontal and vertical directions occur simultaneously, they can be measured separately.

Although the lines are constructed so as to be generated at constant intervals, the lines can be generated only on positions of the tube face substantially opposing the photo sensors $S_1$ through $S_{21}$.

As the lines of constant intervals are gradually shifted during display, the light intensity data for the respective shifts are sampled so that envelope curves on the light intensity data are prepared. The position of a peak value on the envelope curve can be derived and compared so that time distortion and image distortion can be derived.

As described hereinabove, in the CRT measuring/adjusting apparatus, according to the present invention, a plurality of lines arranged at constant intervals on the tube face of the CRT are shifted and displayed for the respective constant values.

Photo sensors, each having a uni-modal directive sensitivity characteristic, are disposed opposing the tube face. The detected output of each photo sensor is used to calculate the modulation factor. The CPU 111 is then used to determine whether the modulation factor data is appropriate. Therefore, for various color CRTs in which sizes and thicknesses of tube face of the color CRT are different, a highly accurate measurement of convergence and/or image distortion can be made at an appropriate line interval.

According to the present invention, in the CRT testing/adjusting apparatus in which lines for each primary color are gradually shifted on the tube face of the color CRT, the light intensity for each primary color is detected by a photo sensor arranged at an opposing position on the tube face, and the convergence state is measured according to the light intensity data. The CPU 111 determines whether a position on the tube face at which the photo sensor is arranged is a white area or not and resets the white area position if the photo sensor is positioned over a white area. Therefore, due to the fact that no operator input is required for transfer of the white area during measurement, the measurement process described above is quick and easy.

In addition, the color CRT testing/adjusting apparatus measures the convergence state from the light intensity of displayed lines of the respective primary colors which are gradually shifted on the tube face of the color CRT. The light intensity for each primary color is detected by a corresponding photo sensor arranged opposing the tube face and a line pattern having a plurality of phases is repeatedly displayed in a constant order. The lines of the respective primary colors are gradually shifted and a misconvergence quantity is prepared for each line pattern. The latest misconvergence quantity of each phase of measured data is arithmetically averaged to derive the average convergence quantity. Therefore, highly accurate measurements can be made without extension of the measurement time.

Furthermore, in the CRT measuring apparatus according to the present invention line patterns for each primary color are gradually shifted on the tube face of a CRT, photo sensors are arranged opposing the tube face for detecting the light intensity for each primary color, and the convergence state of the color CRT is measured from the light intensity data. The line at the first measurement is considered a dummy line and light intensity data from the dummy line is excluded from all measurement data. Therefore, measurement error due to lower brightness at the time of the first measurement can be prevented and the measurement accuracy is improved.

In each photo sensor the photo element holder portion is installed to be movable in the direction of a phantom axis with respect to the probe main body and is swingable with respect to the phantom axis. Means are provided for pressing the photo element holder portion in a direction other than that of the probe main body. This allows the photo sensor to be easily disposed in the detecting position and erroneous detection due to the manipulation thereof can be prevented.

The CRT measuring apparatus according to the present invention includes a pattern generator which outputs a video signal displaying a line pattern on the CRT tube face. Photo sensors are arranged opposing the tube face. A memory is provided for storing the light intensity data which is the detected output of each photo sensor. Means are provided for calculating the difference between the light intensity data stored in the memory and that detected after the storage of light intensity data. Time distortion of the lines can accurately and easily be measured with this apparatus.

The relative distortion of images (image distortion) at each position of the lines can also accurately and easily be measured.

Although the present invention has been shown and described with respect to preferred embodiments, various changes and modifications which are obvious to a person skilled in the art to which the invention pertains are deemed to lie within the spirit and scope of the invention.

What is claimed is:

1. An adjusting apparatus for cathode ray tube equipment, comprising:
   (a) a pattern generator, which generates a predetermined pattern including bars and a white area, is connected to a cathode ray tube under test;
   (b) a probe attached to a front face of the cathode ray tube under test and which comprises a switch for starting measurement and a photo detector for reading the light intensity of the CRT screen at the position of the probe and outputting a corresponding data signal;
   (c) measured data memory means connected to receive the output data signal of the probe for memorizing the data received from the probe; and
   (d) processor means which controls the pattern generator, receives data from the measured data memory, and calculates measurement data therefrom.

2. An adjusting apparatus for cathode ray tube equipment as set forth in claim 1, wherein the pattern generator generates a dummy signal before measuring signals, and the processor calculates data from the probe except datum corresponding to the dummy signal.

3. An adjusting apparatus for cathode ray tube equipment as set forth in claim 1, wherein the predetermined pattern comprises a plurality of lines with predetermined widths therebetween and the probe is marked with a predetermined length in accordance with the predetermined width between the bars.

4. An adjusting apparatus for cathode ray tube equipment as set forth in claim 1, further comprising a display for displaying the data calculated by the processor.

5. An adjusting apparatus for cathode ray tube equipment as set forth in claim 1, wherein the measured data memory means includes analog-to-digital converter means connected to the probe for digitizing the output signal of the probe.

6. An adjusting apparatus for cathode ray tube equipment as set forth in claim 1, wherein the pattern generator generates a plurality of types of line patterns having different phases from each other.

7. An adjusting apparatus for cathode ray tube equipment as set forth in claim 6, wherein the different phases are two phases and have an interlaced relation with each other.

8. An adjusting apparatus for cathode ray tube equipment as set forth in claim 1, wherein the processor times a predetermined time after the processor means receives data from the measured data memory and after the predetermined time the probe detects light intensity data and outputs a corresponding data signal, the measured data memory means stores the data of the probe's output signal, and the processor means receives the data from the measured data memory again.

9. An adjusting apparatus for cathode ray tube equipment as set forth in claim 8, further comprising a display for displaying the data calculated by the processor.

10. An adjusting apparatus for cathode ray tube equipment as set forth in claim 1, further comprising a plurality of probes and a frame which is attached to the front face of the cathode ray tube under test and serves as a mount for the plurality of probes, and wherein the processor means calculates positional differences between the probes and the predetermined pattern.

11. An adjusting apparatus for cathode ray tube equipment as set forth in claim 10, further comprising a display for displaying the data calculated by the processor.

12. An adjusting apparatus for cathode ray tube equipment as set forth in claim 1, wherein the probe further comprises a body including the switch, the switch includes a resiliently biased shaft which acts as a pivot, and a light detector holder which holds the photo detector and is held movably against the pivot.

13. An adjusting apparatus for cathode ray tube equipment as set forth in claim 12, further comprising a display for displaying the data calculated by the processor.

14. An adjusting apparatus for cathode ray tube equipment as set forth in claim 1, wherein that widths (intervals) between lines of the predetermined pattern are changed by the processor.

15. An adjusting apparatus for cathode ray tube equipment as set forth in claim 14, wherein the data calculated by the processor includes a modulation factor (MD) and the processor controls the pattern generator so that the widths between lines of the predetermined pattern are extended when a modulation factor (MD) calculated by the processor is small, and that the widths between lines are shortened when a modulation factor calculated by the processor is large.

16. An adjusting apparatus for cathode ray tube equipment as set forth in claim 15, wherein the location of the white area is changed when the modulation factor calculated by the processor substantially equals zero.

* * * * *